United States Patent [19]

Danloup et al.

[11] Patent Number: 4,781,450
[45] Date of Patent: Nov. 1, 1988

[54] ELONGATE DEFORMABLE STRUCTURE AND APPLICATIONS TO EYEGLASS FRAMES

[75] Inventors: André Danloup, Saint Mihiel; Michel Erasell, Saint Maur; Claude Romanet, La Varenne Saint Hilaire, all of France

[73] Assignee: Essilor International Cie Generale d'Optique, Creteil Cedex, France

[21] Appl. No.: 13,028

[22] Filed: Feb. 10, 1987

[30] Foreign Application Priority Data

Feb. 12, 1986 [FR] France .................. 86 01895

[51] Int. Cl.⁴ .................................. G02C 5/16
[52] U.S. Cl. ........................ 351/114; 351/117
[58] Field of Search ........... 351/111, 114, 117, 119; 148/402

[56] References Cited

U.S. PATENT DOCUMENTS

| 4,037,946 | 7/1977 | Blumenthal | 351/114 |
| 4,255,024 | 3/1981 | de Monts et al. | 351/41 |
| 4,377,328 | 3/1983 | Ferrandi | 351/126 |
| 4,472,035 | 9/1984 | Takamura et al. | 351/41 |

FOREIGN PATENT DOCUMENTS

| 0002993 | 7/1979 | European Pat. Off. |
| 0146317 | 6/1985 | European Pat. Off. |
| 3209508 | 12/1982 | Fed. Rep. of Germany |
| 866316 | 7/1941 | France |
| 1169874 | 1/1959 | France |
| 2198165 | 3/1974 | France |

Primary Examiner—Rodney B. Bovernick
Assistant Examiner—P. M. Dzierzynski
Attorney, Agent, or Firm—Charles E. Brown; Charles A. Brown

[57] ABSTRACT

An elongate deformable structure, that can be used as part of an eyeglass frame, for example, comprises a central core member made from a shape memory alloy. A plurality of annular members are threaded onto the core member. At least one of the annular members has at least one transverse surface disposed obliquely to the axis of the bore through it.

21 Claims, 1 Drawing Sheet

ELONGATE DEFORMABLE STRUCTURE AND APPLICATIONS TO EYEGLASS FRAMES

BACKGROUND OF THE INVENTION

1. Field of the Invention

A general object of the present invention is an elongate deformable structure of the kind comprising a central core member and a plurality of annular members threaded onto the core member; another object of the invention is applications of an elongate deformable structure of this kind to any form of article, in particular eyeglass frames.

2. Description of the prior art

Known eyeglass frames usually comprise at least one elongate component, a main support bar when the front assembly comprises one of these or a central bridge or the temples providing side supports.

To fit an eyeglass frame of this kind to a user it is necessary to deform to a greater or lesser extent one or other of these elongate components to suit the physiological characteristics of the user, for example to adjust the pressure of the temples on the sides of the user's head to a required value.

Over and above the specific esthetic appearance which results, the annular members can if required constitute decorative elements, the use of an elongate deformable structure comprising annular members threaded onto a common central core member constituting a particularly attractive solution to this problem.

SUMMARY OF THE INVENTION

The invention consists in an elongate deformable structure comprising a central core member made from a shape memory alloy and a plurality of annular members threaded onto said core member, at least one of said annular members having at least one transverse surface disposed obliquely to the axis of its bore.

Rotating an annular member with one or both transverse surfaces oblique about the central core member on which it is threaded leads to a modification in the overall configuration of the assembly and so, by adjusting its annular members appropriately, it is possible to confer on the elongate deformable structure in accordance with the invention a configuration appropriate to a specific use.

The central core member of the elongate structure must itself be deformable to follow the corresponding deformations.

It may consist in a wire or other profiled member of soft alloy or metal.

In accordance with the invention, however, the central core member is made from a shape memory alloy.

As is known, a shape memory alloy is an alloy which can be reversibly changed due to the effects of temperature only between two distinct phases in the solid state, a so-called austenitic state and a so-called martensitic state, in each of which it can be given a specific shape that it reverts to spontaneously at the corresponding temperature.

Because of this thermo-elastic behavior it is possible to obtain in practise from a shape memory alloy a significant capacity for expansion between two specific temperatures, usually in the order of between 5 and 8%, and in any event greater than the usual thermal expansion capacity.

For example, a wire or profiled member in shape memory alloy is in the martensitic state at low temperature, and is therefore expanded.

The annular members of the elongate deformable structure whose central core member comprises a wire or profiled member in shape memory alloy are thus loosened and, as already described, it is possible to orient them about the central core member so as to apply to the assembly, which is flexible at this time, the deformations needed to produce the required configuration.

Once it has returned to ambient temperature, that is to say the usual temperature of use, the wire or profiled member constituting the central core member of the elongate deformable structure is in the austenitic state.

It is then contracted and difficult to deform.

Thus the elongate deformable structure whose central core member consists of a wire or profiled member in shape memory alloy is locked into the configuration previously conferred on it and therefore becomes rigid.

However, as it remains possible to change from one state to the other, its configuration can be changed again if necessary, by the same method.

The characteristics and advantages of the invention will emerge from the following description given by way of example with reference to the appended schematic drawings.

DESCRIPTION OF THE PREFERRED EMBODIMENT

Figure 1:
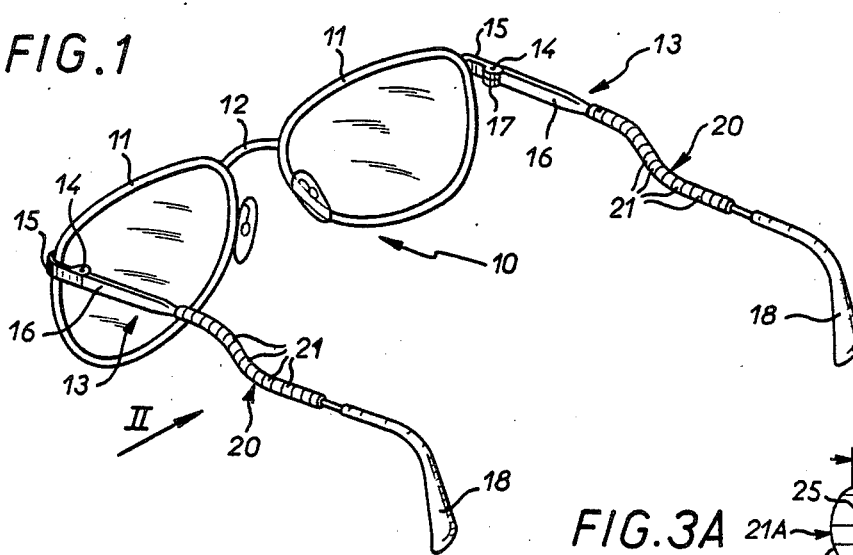
FIG. 1 is a perspective view of an eyeglass frame in which each of the side support temples comprises a deformable structure in accordance with the invention.

FIG. 1 shows an eyeglass frame with a front assembly 10 comprising two rims or surrounds 11 and a central bridge 12 linking these and side support temples 13 each pivoted by a hinge 14 to tenons 15 fastened to the rims or surrounds 11.

As the overall structure of an eyeglass frame of this kind is well known in itself and does not of itself form part of the present invention it will not be described in more detail here.

In a way that is also known in itself each of the side support temples 13 comprises a stem member 16 of which one end carries a knuckle 17 for pivoting it to the corresponding tenon 15 and to the end of which is fitted a flat side tip member 18 for improved user comfort.

In accordance with the invention each of the resulting side support temples 13 comprises in its central area an elongate deformable structure 20.

The elongate deformable structure 20 is of the kind comprising a plurality of annular members 21 threaded by means of the bore 22 in them onto a common central core member 23.

The annular members 21 are of three different types.

Firstly, there is at least one member 21A of which both transverse surfaces 24 are substantially perpendicular to the axis of the bore 22.

Then there is at least one member 21B which has one transverse surface 24 substantially perpendicular to its bore 22, as previously, whereas the other transverse surface 24' is generally oblique relative to the bore.

Finally, there is at least one member 21C of which both transverse surfaces 24' are generally oblique relative to the bore 22.

In a member 21C the transverse surfaces 24' are oblique in opposite senses relative to each other, in a wedge-like configuration.

The elongate deformable structure 20 in accordance with the invention comprises at least one member 21A at each end, at least on member 21B with its perpendicular transverse surface 24 in contact with each of the end members 21A and, in its central part, a plurality of members 21C.

Only members 21C are used in the central part of the elongate deformable structure 20 shown.

However, they may alternate singly or in groups with members 21A and/or 21B themselves disposed individually or in groups.

The various annular members 21 used are all cylindrical with a circular transverse cross-section, the generatrices of their peripheral lateral surface 25 being parallel to the axis of the bore 22.

This is obviously not essential, however, and the annular members 21 could equally well be toroidal or prism-shaped.

Their transverse circular cross-sections all have the same diameter and the maximum length generatrix of the members 21B and 21C has the same length L as the generatrices of the members 21A.

This is not essential, however.

Nor is it essential for the members 21A to be identical to each other or for the members 21C to be identical to each other.

These members are made from metal or a synthetic material and their transverse surfaces 24 and 24' are flat.

By virtue of arrangements which, being obvious to those skilled in the art, will not be described in detail here, there is provided at each end of the array of the various members 21, on the central core member 23 onto which they are all threaded, an abutment member adapted to immobilize the assembly on the central core member 23.

For example, a collar may be provided on the central core member 23, from which it projects to this end and to which it is appropriately attached.

As an alternative to this, the members 21 at the ends could themselves be fastened to the central core member 23, as by adhesive bonding, for example.

The central core member 23 is part of the stem member 16 of the corresponding side support temple 13, forming a localized section of the latter.

In accordance with the invention the central core member 23 is made from shape memory alloy.

This is an alloy of nickel and titanium, for example, or a copper-zinc-aluminum alloy.

The stem members 16 of each of the side support temples 13 may be made entirely from a shape memory alloy of this kind.

However, for reasons of economy it is preferable for only the localized section of the stem member constituting the central core member 23 of the corresponding elongate deformable structure 20 to be made from shape memory alloy, its ends being made from a neutral material, which will be a metal or an alloy chosen so that they can be welded to the shape memory alloy used between them.

The laser welding technique may be employed for this, for example.

Ignoring the resulting junction line, the shape memory alloy central core member 23 is not necessarily distinguishable from the neutral material end sections between which it is inserted, preferably being geometrically continuous therewith.

It may comprise a circular wire or a profiled member provided that the members 21 can rotate about it.

At low temperature, meaning a temperature in the order of −60° C. to −80° C., and in any event a temperature very much lower than the lowest normal ambient temperature, the shape memory alloy from which the central core member 23 of an elongate deformable structure 20 in accordance with the invention is made is in the martensitic state and therefore expanded.

The annular members 21 threaded onto the central core member 23 are therefore able to move to some degree axially along the core member and therefore relative to each other.

As they are threaded onto the central core member 23 with clearance it is then possible to modify their angular orientation relative to the central core member and therefore relative to each other.

Figure 2:
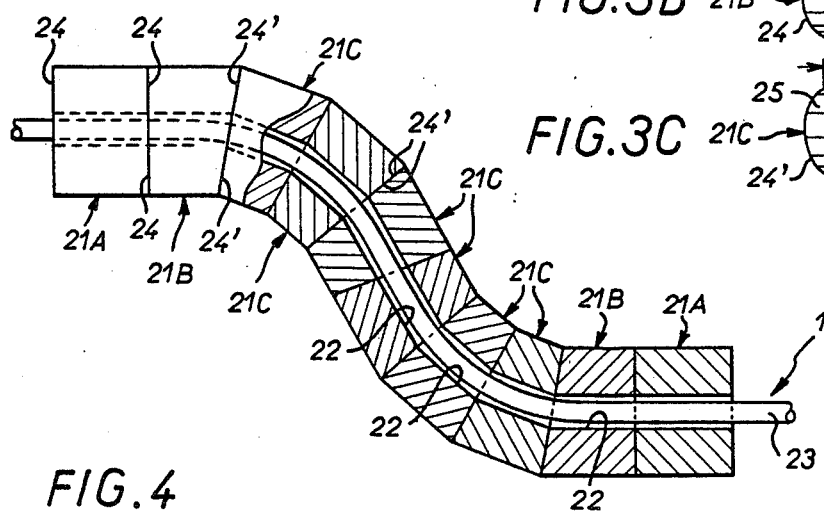
FIG. 2 is a locally cut-away partial view in elevation of an elongate deformable structure of this kind to a larger scale.
Figure 3A:
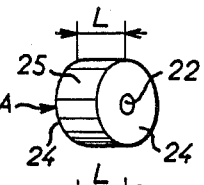
FIGS. 3A, 3B and 3C are perspective views of three respective types of annular member that the elongate deformable structure comprises.
Figure 3B:
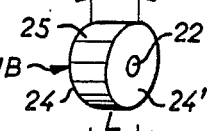
Figure 3C:
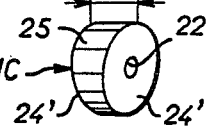
Figure 4:
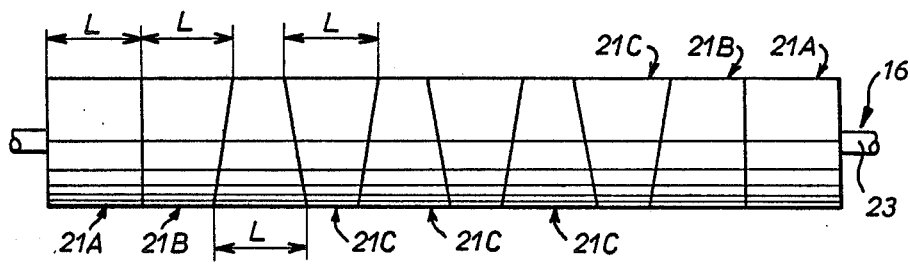
FIG. 4 is a view in elevation analogous to that of FIG. 2 for another configuration of the elongate deformable structure in accordance with the invention.

It will be readily understood that an elongate deformable structure of this kind may be changed, for example, from a substantially rectilinear configuration in which, as shown in FIG. 4, the members 21C with oblique transverse surfaces 24' are alternately reversed by 180° relative to each other, to an S-shaped configuration (FIG. 2) in which the members 21C, or at least some of them, have different angular orientations, in order to secure the required S-shaped configuration.

At ambient temperature the central core member 23 of the elongate deformable structure 20 in accordance with the invention resumes its initial contracted configuration which locks the elongate deformable structure 20 into its new configuration, making it rigid.

It will be easily understood that by applying an appropriate deformation, as previously described, to the elongate deformable structure 20 of each of the side support temples 13 it is possible, depending on the physiological characteristics of the subject, to adjust the height of the front assembly 10 optimally relative to the flat side tip members 18 and/or to adjust optimally the distance between the flat side tip members 18.

It is to be understood that the present invention is not limited to the embodiment described has shown, but encompasses any variant execution.

Specifically, the clamping of the annular members into a selected configuration may be achieved, at least in part, through the use of annular members at the ends (21A in the figures) made from shape memory alloy.

Also, in the case of an application to eyeglass frames other elongate structural components of the frame may also comprise an elongate deformable structure of the kind described.

This applies to the central bridge 12, for example.

Where the front assembly 10 comprises a main support bar, this may also comprise an elongate deformable structure as described.

Applications of the invention are not limited to eyeglass frames.

They encompass any type of article comprising an elongate member or formed by an elongate member.

It might be an item of jewelry, for example, such as a bracelet or necklace.

We claim:

1. Elongate deformable structure comprising a central core member made of a shape memory alloy and a plurality of annular members each having an axial bore and opposed surfaces transverse to the bore thereof, said core member extending through said bores of said annular members, said annular members being mounted for rotation about said core member, at least one of the transverse surfaces of at least one of said annular members being disposed obliquely to the axis of said bore thereof, said core member having an expanded configuration for permitting relative angular displacement of said annular members and a contracted configuration for maintaining said annular members together.

2. Structure according to claim 1, wherein both of the transverse surfaces of at least one of said annular members are disposed obliquely to the axis of the bore thereof.

3. Structure according to claim 2, wherein said transverse surfaces of said at least one annular member are oblique in opposite senses and the said one annular member has a wedge-like configuration.

4. Structure according to claim 3, wherein the transverse surfaces of said annular members are flat.

5. Structure according to claim 2, wherein the annular members at the ends of said plurality of annular members are made from shape memory alloy.

6. Structure according to claim 1, wherein there are at least two types of said annular members, a first type of said annular members having only one oblique transverse surface and a second type of said annular members having two opposed oblique transverse surfaces.

7. Structure according to claim 6, wherein there are a plurality of said second type annular members adjacent one another and a first type annular member at each end thereof.

8. Structure according to claim 7, further comprising a third type of said annular members having transverse ends generally perpendicular to the axis bore thereof, at least one third type annular member being disposed on the side of at least one of said first type annular members axially remote from said second type annular members.

9. Structure according to claim 2, wherein there is a subplurality of said annular members having both transverse surfaces oblique, said annular members of said subplurality being mounted for angular displacement between a first position in which orientation of successive ones of said annular members of said subplurality alternate and a second position in which the orientation of successive annular members of said subplurality is the same.

10. Structure according to claim 2, wherein said annular members having both transverse sides oblique have a zone of minimum axial length substantially 180° from a zone of maximum axial length.

11. Eyeglass frame having at least one elongate structural member of an elongate deformable structure comprising a central core member having at least part of its length made from a shape memory alloy and a plurality of annular members each having an axial bore and opposed surfaces transverse to the bore thereof, said annular members being mounted on said core member for rotatable movement about the core member, at least one of the transverse surfaces of at least one of said annular member being disposed obliquely to the axis of its bore, said core member having an expanded configuration for permitting relative angular displacement of said annular members and a contracted configuration for maintaining said annular members together.

12. Frame according to claim 11, wherein both of the transverse surfaces of said at least one of said annular members are disposed obliquely to the axis of the bore thereof.

13. Frame according to claim 12, wherein said transverse surfaces of said one annular member are oblique in opposite senses and said at least one annular member has a wedge-like configuration.

14. Frame according to claim 11, wherein the transverse surfaces of said annular members are flat.

15. Frame according to claim 11, wherein the endmost ones of said plurality of the annular members are made of shape memory alloy.

16. Frame according to claim 11, wherein there are at least two types of said annular members, a first type of said annular members having only one oblique transverse surface and a second type of said annular members having two opposed oblique surfaces.

17. Frame according to claim 16, wherein there are a plurality of said second type annular members adjacent one another and a first type annular member at each end thereof.

18. Frame according to claim 17, further comprising a third type of said annular members having transverse ends generally perpendicular to the axis bore thereof, at least one third type annular member being disposed on the side of at least one of said first type annular members axially remote from said second type annular members.

19. Frame according to claim 12, wherein there is a subplurality of annular members having both transverse surfaces oblique, said annular members of said subplurality being mounted for angular displacement between a first position in which orientation of successive ones of said annular members of said subplurality alternate and second position in which the orientation of successive annular members of said subplurality is the same.

20. Frame according to claim 12, wherein said annular members having both transverses oblique have a zone of minimum axial length substantially 180° from a zone of maximum axial length.

21. Elongated deformable structure comprising a central core member made of shape memory alloy and selectively having an expanded configuration and a contracted configuration, a plurality of annular members each having an axial bore and opposed surfaces transverse to the bore thereof, said core member extending through said bores of said annular members, said annular members being mounted for rotation about said core member, at least one of the transverse surfaces of predetermined said annular members being disposed obliquely to the axis of the bore thereof, said predetermined annular members being angularly displaceable relative to one another when said core member is in its expanded configuration to deform the shape of said core member and said core member being locked rigid into its deformed shape once said core member is in its contracted configuration.

* * * * *